April 25, 1939.　　　A. E. LARSEN　　　2,155,427
AIRCRAFT SUSTAINING ROTOR
Filed Oct. 19, 1936　　　2 Sheets-Sheet 1

INVENTOR
Agnew E. Larsen
BY
Synnestvedt & Lechner
ATTORNEYS

April 25, 1939.  A. E. LARSEN  2,155,427
AIRCRAFT SUSTAINING ROTOR
Filed Oct. 19, 1936  2 Sheets-Sheet 2
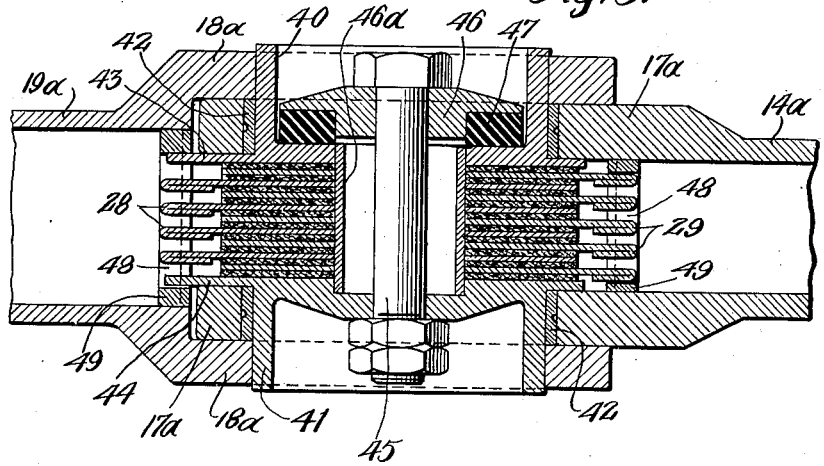
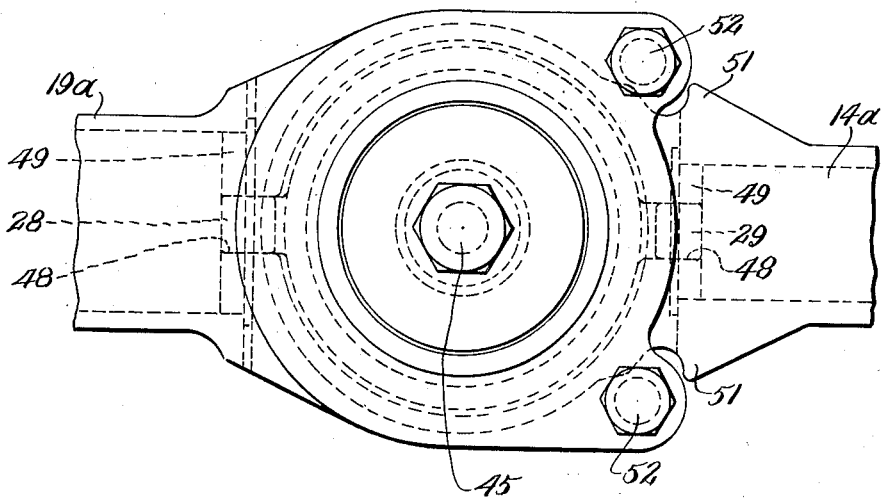
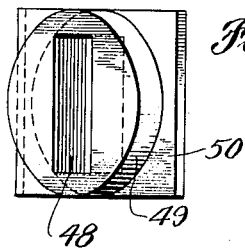
INVENTOR
Agnew E. Larsen
BY
Synnestvedt & Lechner
ATTORNEYS Patented Apr. 25, 1939

2,155,427

UNITED STATES PATENT OFFICE 2,155,427

AIRCRAFT SUSTAINING ROTOR

Agnew E. Larsen, Huntingdon Valley, Pa., assignor, by mesne assignments, to Autogiro Company of America, a corporation of Delaware Application October 19, 1936, Serial No. 106,343

10 Claims. (Cl. 244—18)

This invention relates to aircraft sustaining rotors and is especially concerned with the type of rotor incorporating a plurality of sustaining wings or blades which are pivotally mounted on a common generally upright axis mechanism. Still further the invention is particularly directed to a novel form of blade pivot and a novel form of cooperating device for controlling movement of the blade about such pivot.

One of the primary objects of the invention is the simplification of the pivot and movement control parts, whereby to reduce the weight of the parts and facilitate assembly, adjustment, repairs and the like.

A further and important object of the invention is to provide a blade movement controlling device which is unusually compact and which cooperates with the blade pivot parts in providing a foolproof arrangement, especial attention being directed to the fact that the improved pivot arrangement is also effective in avoiding dislodgment of pivot parts and the consequent damage which would result in flight.

Additionally the invention has in view a blade movement control arrangement in which slack or lost motion is reduced to a minimum, thereby improving the operation.

Further objects and advantages will appear more fully from a consideration of the following description referring to the accompanying drawings, in which—

Figure 3 is a vertical sectional view of a blade pivot joint of modified construction as compared with the arrangements of Figures 1 and 2;

Figure 4 is a plan view of the device shown in Figure 3; and

Figure 5 is an isometric view showing a detail of the construction.

Figure 1:
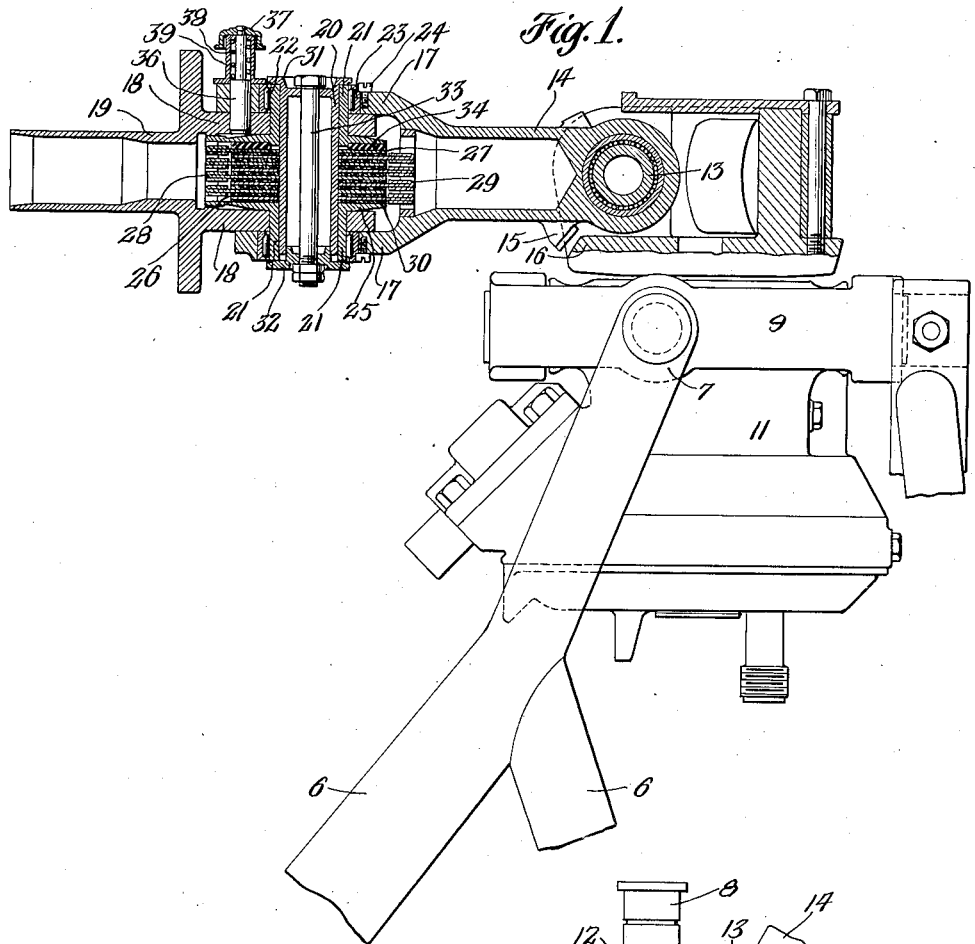
Figure 1 is a side view of a portion of a rotor hub of the character with which the invention is concerned, the view showing the inner or root end of one of the blades and its attachment pivots in vertical section.
Figure 2:
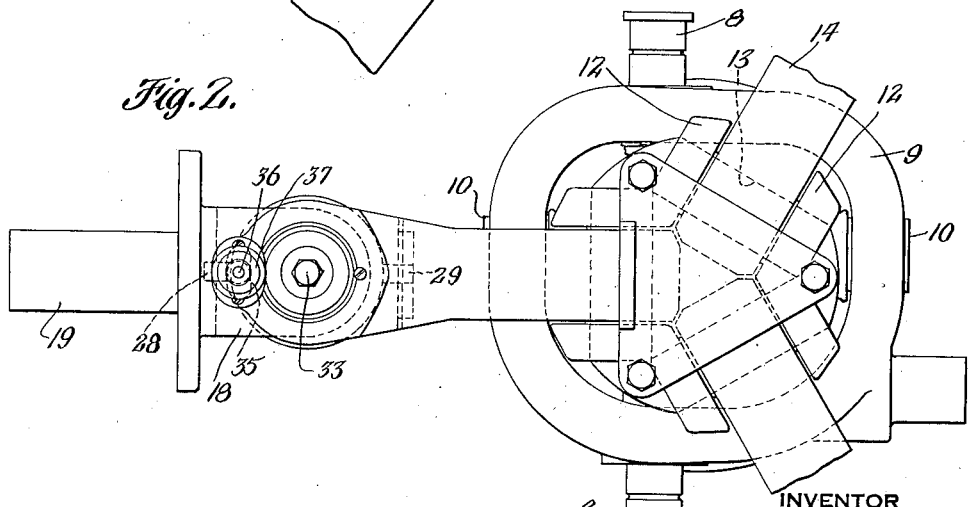
Figure 2 is a plan view of certain hub and blade mounting parts appearing in Figure 1.

Referring first to Figures 1 and 2, the arrangement there shown includes pylon or support elements 6 for the rotor hub which, of course, project upwardly from the main structure of the fuselage and at their upper ends are provided with apertured members 7 adapted to receive trunnions 8 constituting a pivot about which the hub as a whole may be tilted for purposes of controlling the attitude of the craft in pitch in the manner more fully set out in the copending application of Juan de la Cierva, Serial No. 645,985, filed December 6, 1932. The trunnions 8 in turn project from a ring 9 which itself is apertured on an axis generally at right angles to the axis of the trunnions 8 to receive additional trunnions 10 constituting another pivot axis for the hub as a whole which is provided for the purpose of controlling the attitude of the craft in roll in accordance with said copending application. The trunnions 10 are secured to the hub proper 11, the upper portion of which is provided with pairs of apertured ears 12 (three being shown in the arrangement of Figures 1 and 2) for cooperation with the several blades incorporated in the rotor.

Each pair of ears or lugs 12 receives a pivot pin 13 which also passes through a member or link 14 serving to attach a blade to the hub. From Figures 1 and 2 it will be seen that the axis of pivot 13 is positioned substantially horizontally, i. e., constitutes a "flapping" axis, whereby to provide for pivotal movement of the blade in a direction generally transverse the rotative path of travel. Cooperating stops 15 and 16 serve to limit excessive downward movement of the blade, for example, when the rotor is at rest or not rotating at flight speed.

Toward its outer end the member 14 is forked in a vertical plane to provide a pair of prongs 17 which embrace a cooperating pair of prongs 18 forming a fork end on the root end fitting 19 of the blade. The two pairs of forks are apertured in their interengaging portions to receive a pivot 20 which defines the axis of a "drag" pivot about which the blade may swing generally fore and aft in its rotative path of travel. Toward each end the pivot 20 is surrounded by a sleeve 21 which serves as the inner race of a roller bearing preferably of the needle roller bearing type indicated at 22. An outer race 23 completes this bearing and cooperates with the aperture in one of the prongs 17. The bearing may be prevented from dislodgment or rotation by means of a set screw 24.

Toward its inner end each one of the sleeves 21 is provided with a flange 25, the two flanges being spaced from each other and serving to cooperate with the interposed friction disc device now to be described for controlling movement of the blade about the axis of pivot 20.

The blade movement control device includes a plurality of interleaving centrally apertured discs 26 and 27. Those numbered 26 are provided with ears 28 projecting into a hollowed part of the root end fitting 19 for the blade so as to prevent rotation of these members about the axis of the pivot. Similarly, discs 27 are provided with ears 29 which cooperate with member 14, and friction rings 30 are interposed between the adjacent discs which move with the two blade mounting parts 14 and 19. Thus movement of the two blade mounting parts is resisted by the friction action of the discs 26, 27 and 30.

For the purpose of adjusting the frictional reaction of the device, the pivot pin 20 is provided with an external flange 31 at one end thereof bearing on the outer end of the adjacent sleeve 21. At the other end a flanged cap member 32 is employed, and a central bolt 33 serves to draw the cap member 32 against the adjacent sleeve 21, and this action, in turn, presses the friction discs between the opposed flanges 25. Adjustment of the friction value is obtained by means of the bolt 33. An annular resilient member 34, preferably formed of rubber, is desirably interposed between one of the flanges 35 and the adjacent friction disc so that the pressure will be substantially equalized circumferentially of the device.

In normal flight operation the blade and thus the root end fitting 19 thereof may be moved under the influence of flight forces against the frictional resistance of the device just described, but to prevent excessive displacement of the blade beyond the mid position, a limiting stop is employed. This stop comprises an arcuate slot 35 (see Figure 2) formed in the upper prong 18 of the member 19, into which slot a pin 36 projects, so that in flight the blade may be moved in either direction from the mid position until the pin abuts against the end of the arcuate slot 35.

For the purpose of permitting folding of the blade about the axis of pivot 20, the pin 36 may be withdrawn upwardly from the slot 35 as by a cap 37. A spring 38 nested within and cooperating with the housing 39 serves normally to retain the pin 36 in engagement with the slot 35.

In general, it might be noted that the mode of assembly of this device comprises first inserting the prongs 18 between the prongs 17 of the two blade pivot members, then inserting the flanged sleeves 21 from the inside, and thereafter assembling and positioning the friction discs. Finally, the pin 20 is inserted and the entire assembly secured in place by means of the bolt 33 and set screws 24.

The arrangement of Figures 3, 4 and 5 is similar in some respects to that described above. The differences between the two are referred to just below.

In this case the blade root fitting 19a is provided with forked prongs 18a which receive the prongs 17a of the extension link 14a therebetween. The drag pivot includes a pair of generally cup-shaped members 40 and 41 which are inserted through the apertures in the forks from between the forks 17a. These members 40 and 41 comprise the bearing proper of the drag articulation, and a bearing bushing 42 may be interposed between each one and one of the prongs 17a. The bearing parts proper are further provided with flanges 43 and 44 spaced from each other to receive the nest of friction discs therebetween.

The lower cup member 41 cooperates with the adjusting bolt 45, which latter bears on a flanged circular part 46. The part 46, in turn, bears on the resilient ring 47 which, in turn, contacts with the upper bearing member 40 and thus transmits pressure to the friction discs. Adjustment of the friction value is again obtained by adjustment of the bolt 45. A central sleeve 46a serves to position the friction discs, and in connection therewith it is noted that this sleeve is of such length as to leave clearance between the part 46 and the web of the bearing element 41, so that freedom for adjustment by the bolt 45 is not interfered with.

The friction disc arrangement is essentially similar to that described above and includes a plurality of interleaving discs some of which are non-rotative with respect to the member 14a and others of which are non-rotative with respect to the member 19a. The projecting lips 28 and 29 of the friction discs may be received in a slot 48 formed in a fitting 49 (see Figure 5) which, as seen in Figures 3 and 4, is positioned in the central hollow provided in members 14a and 19a. Laterally projecting flanges 50 on the member 49 serve to position these members when the parts are assembled.

In the arrangement of Figures 3, 4 and 5, the mechanism for restricting abnormal movement of the blade about the drag articulation consists of a pair of abutments 51 formed on member 14a and positioned to cooperate with bolts 52, which, as clearly seen in Figure 4, are spaced from the abutments 51 when the blade is in mid position about the drag articulation. If it is desired to fold a blade about the drag articulation, one or the other of the bolts 52 may be removed, and the blade thus swung past the limit normally imposed by the abutment 51.

In considering the foregoing two embodiments of the invention, it may be noted that the arrangement of Figures 3 to 5 inclusive is characterized by extreme simplicity, particularly in the parts employed to form the drag articulation. The form of Figures 3 to 5, moreover, adapts the novel type of blade movement control to an articulation of the simple bearing type.

On the other hand, the device of Figures 1 and 2 results in considerable reduction in the diameter of the parts, especially the pivot parts. This arrangement is also of especial advantage since the central pin 20 is a beam support between the two parts of the bearing, thus reducing deflection under various conditions of operation. Furthermore, in Figures 1 and 2, the device is capable of adjustment without shifting the position of the bearing surface proper.

In summary, it may be observed that both forms are characterized by the employment of relatively few parts which may be of light weight and are capable of ready adjustment, inspection and the like.

As compared with prior forms of blade movement control devices, both arrangements described above have much more direct reaction between relatively movable parts of the blade and in consequence, lost motion, both initially and as a result of wear, is reduced to a minimum.

The arrangements disclosed are still further of advantage since, when it is desired to fold the blades, this may readily be accomplished merely by displacing a limiting stop. Displacement of the stop, however, does not disconnect the friction device and, in consequence, the folding movement of the blade is resisted slightly, which is of advantage in preventing accidental swinging of the blades during folding and unfolding.

I claim:

1. For an aircraft sustaining rotor having a hub and a blade pivotally secured thereto, a pair of blade mounting members each of which is forked and the prongs of one of which are fitted between the prongs of the other, the interfitting prongs of the two forks being apertured to receive pivot parts, a pair of pivot parts one of which projects through the apertures in one prong of each member and the other of which projects through the apertures in the other prong of each member, a friction disc device for controlling pivotal movement of said members about the axis of said parts including a plurality of discs interposed between the pivot parts, and adjustable means for advancing said pivot parts toward and away from each other to adjust the pressure of the friction discs.

2. For an aircraft sustaining rotor having a hub and a blade pivotally secured thereto, a pair of blade mounting members each of which is forked and the prongs of one of which are fitted between the prongs of the other, the interfitting prongs of the two forks being apertured to receive pivot parts, a pair of pivot parts one of which projects through the apertures in one prong of each member and the other of which projects through the apertures in the other prong of each member, a friction disc device for controlling pivotal movement of said members about the axis of said parts including a plurality of discs interposed between the pivot parts, and adjustable means for advancing said pivot parts toward and away from each other to adjust the pressure of the friction discs including an adjusting element extended centrally through the pivot parts and the discs.

3. For an aircraft sustaining rotor having a hub and a blade pivotally secured thereto, a pair of blade mounting members each of which is forked and the prongs of one of which are fitted between the prongs of the other, the interfitting prongs of the two forks being apertured to receive a pivot device, a pivot device extended through said apertures and pivotally joining said members, and a plurality of cooperating friction discs for controlling relative pivotal movement of the two forked members, said discs being arranged concentrically with the pivot axis and being nested between the pairs of prongs of the two forked members, and each disc further being provided with a tab projecting beyond its periphery and engaging a forked member adjacent the base thereof to ensure rotation of that disc with the engaged forked member, there being cooperating friction discs with projecting tabs engaging each of the two forked members as aforesaid whereby to frictionally resist pivotal movement of the forked members.

4. In an aircraft sustaining rotor having a hub and a blade pivotally secured thereto, a pair of blade mounting members each of which is forked and the prongs of one of which are fitted between the prongs of the other, the interfitting prongs of the two forks being apertured to receive pivot mechanism, a central pivot element axially arranged with respect to the prong apertures, a pair of bearing sleeves positioned by said element one projecting through the apertures in one prong of each member and the other projecting through the apertures in the other prong of each member, each of said sleeves having an annular flange toward its inner end and the two flanges being spaced from each other, and a friction device for controlling relative pivotal movement of said members, said device being interposed between said flanges.

5. In an aircraft sustaining rotor having a hub and a blade pivotally secured thereto, a pair of blade mounting members each of which is forked and the prongs of one of which are fitted between the prongs of the other, the interfitting prongs of the two forks being apertured to receive pivot mechanism, a central pivot element axially arranged with respect to the prong apertures, a pair of bearing sleeves positioned by said element one projecting through the apertures in one prong of each member and the other projecting through the apertures in the other prong of each member, each of said sleeves having an annular flange toward its inner end and the two flanges being spaced from each other, and a friction device for controlling relative pivotal movement of said members, said device being interposed between said flanges, together with means for advancing said sleeves toward each other to adjust the frictional reaction of said device.

6. In an aircraft sustaining rotor having a hub and a blade pivotally secured thereto, a pair of blade mounting members each of which is forked and the prongs of one of which are fitted between the prongs of the other, the interfitting prongs of the two forks being apertured to receive pivot mechanism, a central pivot element axially arranged with respect to the prong apertures, a pair of bearing sleeves positioned by said element one projecting through the apertures in one prong of each member and the other projecting through the apertures in the other prong of each member, a friction device for controlling relative pivotal movement of said members, portions of said device being interposed between the bearing sleeves, and means for advancing said sleeves toward each other to adjust the frictional reaction of said device.

7. For an aircraft sustaining rotor having a hub and a blade pivotally secured thereto, a pair of blade mounting members at least one of which is forked to embrace the other, the interfitting portions of the two members being apertured to receive a pivot part, a pivot part extended through said apertures and taking centrifugal load during rotation of the rotor, a device for controlling pivotal blade movement about the axis of said pivot part, said device being positioned between the prongs of the forked member adjacent to the pivot part, said device being adjustable and said pivot part being axially movable in the apertures of the said mounting members and being associated with the device to effect adjustment thereof upon axial movement of the pivot part, and adjustable means for axially moving said pivot part to adjust the control afforded by said device.

8. For an aircraft sustaining rotor having a hub and a sustaining blade pivoted thereto, a pair of blade mounting parts each of which is forked and one of which is fitted between the prongs of the other, the prongs of both forks being apertured to receive a pivot pin and each fork being provided with a recess at its base opening toward the space between its prongs, and a device for controlling blade movement about the pivot axis of said pin including a stack of friction discs having tabs projecting beyond the periphery thereof, the discs including two groups thereof, the projecting tabs of one of which groups engages the recess in one fork and the projecting tabs of the other group engages the recess of the other fork.

9. For an aircraft sustaining rotor having a hub and a sustaining blade pivoted thereto, a pair of blade mounting parts each of which is forked and one of which is fitted between the prongs of the other, the prongs of both forks being apertured to receive a pivot pin, and each fork being provided with a recess at its base opening toward the space between its prongs, and a device for limiting pivotal movement of the blade about the axis of said pin, said device being concentrically arranged about the pin, disposed between the prongs of one of the forked parts and having actuating elements projecting beyond the periphery thereof and respectively engaging the recesses at the base of said forks.

10. For an aircraft sustaining rotor having a hub and a sustaining blade pivoted thereto, a pair of blade mounting parts each of which is forked and one of which is fitted between the prongs of the other, the prongs of both forks being apertured to receive a pivot pin, and each fork being provided with a recess at its base opening toward the space between its prongs, a device for limiting pivotal movement of the blade about the axis of said pin, said device being concentrically arranged about the pin, disposed between the prongs of one of the forked parts and having actuating elements projecting beyond the periphery thereof and respectively engaging the recesses at the base of said forks, said tabs having freedom for movement in the recesses in a direction paralleling the axis of said pin, and means for adjusting the interengaging pressure of the cooperating friction discs.

AGNEW E. LARSEN.